United States Patent
Lai et al.

(10) Patent No.: US 6,466,939 B1
(45) Date of Patent: Oct. 15, 2002

(54) SYSTEM AND METHOD FOR COMMUNICATING VIDEO DATA IN A DIGITAL MEDIA DEVICE

(75) Inventors: Angela C. Lai, Mountain View; Kevin R. Meier, Redwood City, both of CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/539,365

(22) Filed: Mar. 31, 2000

(51) Int. Cl.$^7$ ............................................. G06F 17/30
(52) U.S. Cl. ................................... 707/101; 707/104.1
(58) Field of Search ............................ 707/101, 104.1; 345/542; 370/271, 348, 389, 395.4, 458

(56) References Cited

U.S. PATENT DOCUMENTS 6,070,002 A * 5/2000 Hagemark et al. .......... 709/250
6,172,971 B1 * 1/2001 Kim ........................... 370/348
6,317,134 B1 * 11/2001 Hagemark et al. .......... 345/542

* cited by examiner

Primary Examiner—Diane D. Mizrahi
Assistant Examiner—Apu M Mofiz
(74) Attorney, Agent, or Firm—Lee & Hayes, PLLC (57) ABSTRACT

A system for communicating video data in a digital media device includes an application layer having one or more applications and further includes a device driver layer associated with an operating system and video hardware of the digital media device. A video abstraction layer (VAL) coupled to the application layer and to the device driver layer includes a send queue containing ordered references to buffers that are each capable of containing video data. The VAL also includes a receive queue containing ordered references to buffers each capable of containing video data. The send queue and receive queue are used in substantially the same manner for both incoming video data received into the digital media device and outgoing video data to be communicated from the digital media device.

41 Claims, 6 Drawing Sheets

SYSTEM AND METHOD FOR COMMUNICATING VIDEO DATA IN A DIGITAL MEDIA DEVICE

TECHNICAL FIELD OF THE INVENTION

This invention relates in general to communications and more particularly to a system and method for communicating video data in a digital media device.

BACKGROUND OF THE INVENTION

Many digital media devices are configured to receive incoming data generated outside the devices and to communicate outgoing video data from the devices. The software applications within such devices have often used access structures such as application programming interfaces (APIs) to communicate information relating to this video data with the software that is more closely associated with the operating system and video subsystem hardware of these devices. Such APIs have typically treated incoming and outgoing video data streams in different manners, have strictly dictated the manner in which memory is allocated to buffers that contain the video data, and have provided two separate messaging structures even for outgoing video data—one for sending pointers to buffers containing video data and another for sending control messages to manipulate parameters of that video data.

For example, for the outgoing video data, previous devices have provided a send queue containing application-generated references to particular buffers that are individually allocated within memory and filled with the outgoing video data to be communicated. A receive queue returns the references to the application after the video data has been communicated from the device so that the application can then de-allocate the memory for the buffers. However, the incoming video data has been handled quite differently. For example, for incoming video data, previous devices have pre-allocated a pool of buffers and merely selected randomly or sequentially from the many available buffers in this pool, filled these buffers with the incoming video data, and sent the application messages identifying the buffers that have been filled. The application receives this message, accesses the video data in the specified buffer for processing, and returns the buffer to the pool for reuse.

In addition to requiring software for incoming video data to be developed and debugged separately from the software for outgoing video data, such systems do not allow application developers to determine the memory allocation strategy to be used with respect to the buffers—the APIs within these systems strictly dictate how the memory is to be allocated. Nor do such systems allow buffers to be shared among multiple video data streams. Moreover, previous systems do not provide adequate synchronization between control information and corresponding incoming video data, do not allow outgoing and incoming video data rates to be precisely and efficiently decreased, and do not allow timestamps associated with communication or receipt of different video data units to be meaningfully compared across multiple components within a system. These and other disadvantages have often made prior techniques inadequate for many video communication needs and environments.

SUMMARY OF THE INVENTION

According to the present invention, problems and disadvantages associated with prior techniques for communicating video data have been substantially reduced or eliminated.

In one embodiment of the present invention, a system for communicating video data in a digital media device includes an application layer having one or more applications and a device driver layer associated with an operating system and video hardware of the digital media device. A video abstraction layer (VAL) coupled to the application layer and the device driver layer includes a send queue containing ordered references to buffers that are each capable of containing video data. The VAL also includes a receive queue containing ordered references to buffers each operable to contain video data. The send and receive queues are used in substantially the same manner for both incoming video data received into the digital media device and outgoing video data to be communicated from the digital media device.

In a more particular embodiment, the buffers are allocated in a memory of the digital media device according to a memory allocation strategy, the VAL not dictating the memory allocation strategy. In another more particular embodiment, at least some of the buffers are shared among two or more video paths. In another more particular embodiment, the send queue further contains at least one control instruction for manipulating at least one parameter of video data for one or more buffer references that follow the control instruction in the send queue. In yet another more particular embodiment, the references in the receive queue include timestamps associated with communication of corresponding video data into or out of the digital media device, as the case may be.

The present invention provides a number of important technical advantages over prior techniques. The queue framework within the VAL allows incoming and outgoing video data to be treated in substantially the same manner. Using the same queue framework for both incoming and outgoing video data also provides a unified programming model for input and output video data and control paths, which makes application development and debugging simpler, faster, and more economical than with previous systems. The present invention also allows application developers to maintain direct control over the memory allocation strategies to be used with respect to the buffers, in contrast to previous systems. The present invention also provides synchronization of path control instructions with references to the buffers, for both input and output, to provide frame-accurate, field-accurate, or other video-data-unit-accurate control not available with previous systems. The use of a common queue framework for both incoming and outgoing video data also allows applications to interact with multiple input/output (I/O) devices that share buffers (which may be sized, aligned, or otherwise registered to be suitable for all I/O devices of interest) between their respective video channels. Furthermore, the present invention allows the outgoing and incoming video data rates to be precisely and efficiently decreased using dummy buffer references, and allows timestamps associated with video data units to be meaningfully compared across multiple components in a system. These and other technical advantage make the present invention well suited for modem digital media devices and video data communications environments. Other technical advantages are readily apparent to those skilled in the art.

BRIEF DESCRIPTION OF THE DRAWINGS

FIGS. 5 (A–B) illustrates an exemplary method of communicating outgoing video data in a digital media device; and FIGS. 6 (A–B) illustrates an exemplary method of communicating incoming video data in a digital media device.

DETAILED DESCRIPTION OF THE INVENTION

Figure 1:
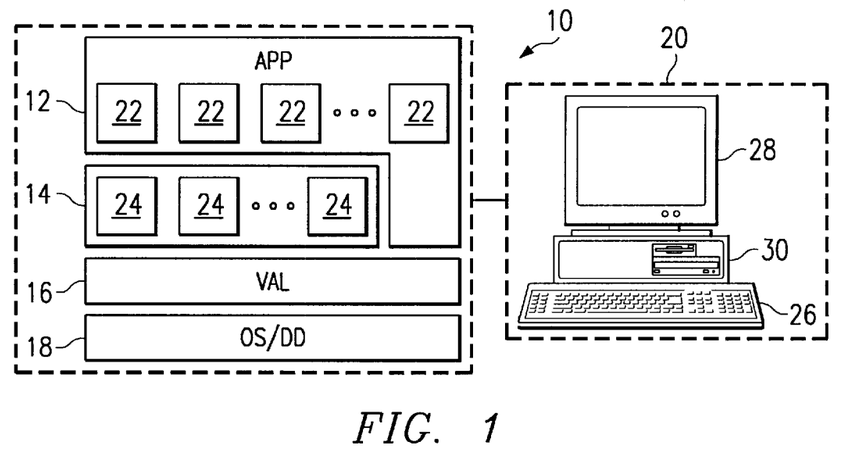
FIG. 1 illustrates an exemplary system for communicating video data in a digital media device.

FIG. 1 illustrates an exemplary system 10 for communicating video data in a digital media device 20. In one embodiment, system 10 includes an application layer 12, an optional personality module layer 14, a video abstraction layer (VAL) 16, and a device driver layer 18 that communicate with one another according to the operation of a digital media device 20, which may be a computer workstation or any other suitable digital media device 20. Application layer 12 includes one or more software applications 22 that process and control the communication of video data in digital media device 20. Personality module layer 14 is an optional layer that includes one or more personality modules 24, each of which may include one or more high level digital media toolkits, application programming interfaces (APIs), or any other suitable software components. Examples of such personality modules 24 may include MICROSOFT VIDEOFORWINDOWS, MICROSOFT DIRECTSHOW, and APPLE QUICKTIME, although any appropriate personality module 24 may be used without departing from the intended scope of the present invention.

Device driver layer 18 provides driver functionality suitable for the operating system and video subsystem hardware associated with digital media device 20. VAL 16 includes one or more video libraries, APIs, or other software components suitable to encapsulate the video resources of digital media device 20 in support of the video communications needs of the higher level software associated with application layer 12, personality module layer 12, or both layers 12 and 14. Applications 22 may use one or more personality modules 24, which then use VAL 16 to access appropriate video resources of digital media device 20. Alternatively, as illustrated in FIG. 1, the architecture of system 10 may allow one or more applications 22 to access VAL 16 directly without using personality module layer 14. As an example, it might be desirable for an appropriate high performance video editing application 22 to access VAL 16 directly rather than through personality module layer 14.

The availability of VAL 16 allows for parallel and independent development of software and hardware components of digital media device 20. Machines running similar implementations of VAL 16 may also share suitable application code written with respect to a particular personality module 24. In one embodiment, VAL 16 may provide functionality vital to professional video application development yet lacking in typical personality modules 24 or other higher level toolkits or APIs. As described more fully below, such advantageous functionality may include, without limitation: (1) user controlled memory allocation strategy, including possible sharing of buffers among video data streams for multiple video paths; (2) substantially similar treatment of outgoing and incoming video data streams using send and receive queues; (3) in both these send and receive queues, control instructions queued in relation to buffer references to provide frame-accurate, field-accurate, or other video-data-unit-accurate control; (4) at least in the receive queue, time stamped buffers references and event messages for improved synchronization; and (5) other important functionality lacking in previous systems and associated APIs. These advantages, viewed singly or in any combination, make system 10 incorporating VAL 16 desirable in a variety of video communications contexts.

Although digital media device 20 is described primarily as being a computer workstation, those skilled in the art will readily appreciate that the present invention encompasses all appropriate digital media devices 20. Digital media device 20 may include an input device 26, such as a keypad, mouse, touch screen, microphone, or other suitable device to receive input from one or more users. An output device 28 may convey information associated with the operation of digital media device 20, including visual or audio information, to one or more users. Digital media device 20 may include suitable fixed or removable storage media, such as magnetic computer disks, CD-ROM, or other media to receive input from and provide output to one or more users. Digital media device 20 further includes a processor 30 and associated volatile or non-volatile memory to execute instructions and manipulate information according to the operation of digital media device 20.

In one embodiment, a video jack may be defined as a physical connector on digital media device 20 and associated hardware suitable for manipulating video data as it enters or leaves digital media device 20. Video jacks may include, for example only and not by way of limitation: one or more composite (RCA) jacks, s-video (Y/C) output jacks, serial data interface (SDI) (D1) jacks, or any other suitable video jacks, in any suitable combination. A video path in digital media device 20 may be defined as an end-to-end flow of video data through at least a portion of the digital media device 20 that involves one or more video jacks.

For example, a device-to-memory (video in) path may bring video data from outside digital media device 20 through a suitable video jack and video pixel path into digital media device 20 for communication to memory. Analogously, a memory-to-device (video out) path may transfer video data from memory through a video pixel path and suitable video jack for communication outside digital media device 20. A device-to-device (pass through) path may bring video data from outside the digital media device 20 through a first video jack and pass the video data through to a second video jack for communication outside digital media device 20, without the video data moving through any pixel processing path. Other suitable video paths may be defined according to particular needs. In one embodiment, video paths and video jacks may be represented in digital media device 20 as software objects.

Before communication of video data into or out of digital media device 20, application 22, device driver layer 18, or another component of digital media device 20 may be required to open a video path, if one is available, for allocation of suitable resources to the path. Similarly, an application 22, device driver layer 18, or other component of digital media device 20 may be required to close an open path for de-allocation of those resources following communication of video data through the path. Video data remaining within a path but not fully communicated at the time the path is closed may be communicated as if the path was open, may be returned to its source, may be discarded, or may be dealt with in any other suitable manner.

In addition to opening a video path, application 22, device driver layer 18, or another component of digital media device 20 may be required to activate the path before a stream of video data may be communicated through the path. Similarly, an application 22, device driver layer 18, or other component within the digital media device 20 may need to deactivate an activated path following communication of the stream of video data through the path. In one embodiment, a path must be activated for each video data stream that is to be communicated and must be deactivated after the video data stream has been communicated, while a video path may remain open for one or multiple video data streams. Video data remaining in a video path but not fully communicated at the time that path is deactivated may be communicated as if that path was still activated, may be returned to its source, may be discarded, or may be dealt with in any other suitable manner.

Figure 2:
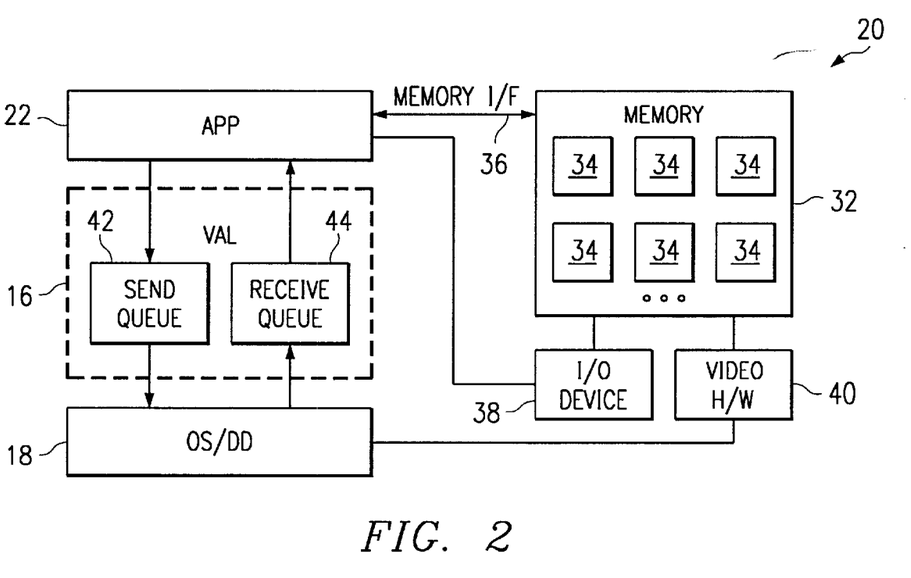
FIG. 2 further illustrates an exemplary system for communicating video data in a digital media device.

FIG. 2 further illustrates system 10 and the interaction between software and hardware to communicate video data within digital media device 20. Memory 32 contains buffers 34 or other memory locations for storing frames, fields, or any other suitable units of video data. In one embodiment, application 22 allocates buffers 34 during operation of system 10 according to a suitable memory allocation strategy. Unlike previous systems, in which the video hardware imposed a memory allocation strategy on applications within the system and therefore on the developers of those applications, VAL 16 allows the memory allocation strategy to be detached from a particular video device with which an application is to be used, which provides an important technical advantage. As a result, application developers are able to provide a memory allocation strategy of their choosing.

Application 22 may communicate with memory 32 directly using a central processing unit (CPU) and a suitable memory interface 36 to allocate buffers 34, fill buffers 34 with outgoing video data, read incoming video data from buffers 34, and de-allocate buffers 34 according to the operation of system 10. In the alternative, application 22 may use one or more appropriate input/output (I/O) devices 38 and associated direct memory access (DMA) engines to perform one or more of these operations. Device driver layer 18 uses video hardware 40 and an associated DMA engine to read outgoing video data from buffers 34 and fill buffers 34 with incoming video data according to operation of system 10. The present invention contemplates allocating buffers 34, filling buffers 34, reading from buffers 34, de-allocating buffers 34, or otherwise manipulating buffers 34 (or other memory locations in memory 32) in any suitable manner according to particular needs. Memory 32 may be system main memory or memory that is under the control of other hardware or software, such as a graphics processor associated with a graphics card or a video processor associated with a video card.

As described more fully below with reference to FIGS. 3 and 4, VAL 16 includes send queue 42 and receive queue 44 that application 22 and device driver layer 18 use to communicate references to buffers 34, path control instructions, jack control instructions, and other appropriate information relating to both outgoing and incoming video data. The treatment of incoming and outgoing video data using the same queue framework provides a unified programming model for input and output video data and control paths, which makes application development and debugging simpler, faster, and more economical. Also as described below with reference to FIGS. 3 and 4, this unified approach allows for synchronization of path control instructions with references to buffers 34, for input as well as output, to provide frame-accurate, field-accurate, or other video-data-unit-accurate control, which is another important technical advantage of the present invention.

Figure 3:
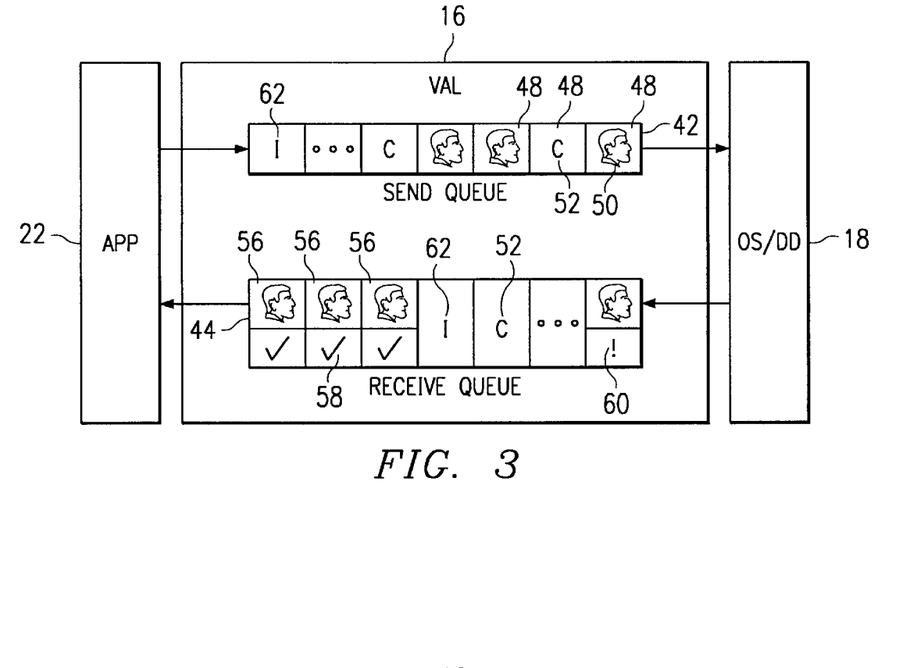
FIG. 3 illustrates the exemplary outputting of video data using send and receive queues.

FIG. 3 illustrates exemplary outputting of video data from digital media device 20 using send queue 42 and receive queue 44 of VAL 16. In a particular embodiment, a separate send queue 42 and receive queue 44 may be associated with each outgoing video path. Send queue 42 contains ordered request messages 48 from application 22 to be communicated to device driver layer 18. In one embodiment, each request message 48 includes either: (1) a pointer or another suitable reference 50 to a particular buffer 34 in memory 32 that contains video data to be communicated out of digital media device 20; (2) a jack or path control instruction 52 relating to one or more parameters of a particular video jack or video path, respectively; or (3) any other suitable information 62 related to communication of video data from digital media device 20. The present invention contemplates any other appropriate request messages 48 according to particular needs.

Using one or more path control instructions 52, application 22 may modify at least one parameter of each output video path synchronous with communication of video data through the path. In one embodiment, a path control instruction 52 is queued at the tail of send queue 44 for communication to and processing at device driver layer 18 in the order it is received relative buffer references 50. As a result, new control settings take effect beginning with the buffer 34 that corresponds to the first buffer reference 50 following the path control instruction 52 in send queue 42. However, buffers 34 that precede the path control instruction 52 in send queue 42 are not affected. Thus, application 22 may precisely specify the buffers 34 to which a particular path control instruction 52 should apply according to the order in which application 22 places buffer references 50 and path control instructions 52 in send queue 42. As a result, the present invention provides frame-accurate, field-accurate, or other video-data-unit-accurate control. Furthermore, as above, VAL 16 uses an analogous queue framework incorporating send queue 42 and receive queue 44 for inputting video data into digital media device 20, providing an important technical advantage over previous systems.

Output path control instructions 52 may include, for example only and not by way of limitation: (1) where to start displaying horizontally video data for one or more frames, fields, or other video-data-units; (2) the number of pixels to display horizontally; (3) where to start displaying vertically the video data for one or more frames, fields, or other video-data-units; (4) where to place one or more frames, fields, or other video-data-units within a fall raster scan; (5) the number of lines to display within one or more frames, fields, or other video-data-units; (6) a pixel format to display from, including but not limited to pixel color space, component size, and component ordering; (7) whether two or more video fields or other video-data-units will be interleaved in a buffer 34; (8) one or more height-to-width, width-to-height, or other pixel aspect ratios; and (9) any other appropriate path control instructions 52. One or more output path control instructions 52 may overlap in their effects. One or more path control instructions 52 may require settings to be consistent with settings for jacks associated with the corresponding video path.

In one embodiment, jack control instructions 52 relating to output jacks may include, for example, modifying the phase, gain, amplitude, level, timing, or other suitable characteristic of an output jack involved in a video path of interest. One or more output jack control instructions 52 may overlap in their effects on associated video subsystem hardware. In one embodiment, unlike path control instructions 52 described above, jack control instructions 52 are not synchronized relative to buffer references 50. Instead, any one or more open video paths that include the jack being manipulated are affected according to jack control instruction 52 as soon as associated hardware is able to effect instruction 52. For example, if one or more frames of video data are queued to be sent out through a particular jack, and a brightness jack control instruction 52 is received at device driver layer 18, the brightness for that jack will likely be manipulated during communication of a frame rather than at any frame boundary. Jack control instruction 52 may apply to one or more video paths that include the jack to be manipulated, but are not yet opened. Although jack control instructions 52 are described as being unordered relative to buffer references 50, the present invention contemplates suitable synchronized jack control instructions 52 according to particular needs.

Also associated with each output video path is a receive queue 44 containing ordered response messages 56 from device driver layer 18 to be communicated to application 22. In one embodiment, each response message 56 includes either: (1) a pointer or other reference 50 to a particular buffer 34 in memory 32 containing video data that was to be communicated from digital media device 20, along with an indication 58 that the video data was successfully communicated; (2) a pointer or other reference 50 to a particular buffer 34 containing video data that was to be communicated from digital media device 20, along with an error code or any other indication 60 that the video data was not successfully communicated; (3) a control instruction 52 returned from device driver layer 18 following its execution; or (4) other information 62 relating in some manner to the communication of video data from digital media device 20. For example only and not by way of limitation, information 62 may indicate a loss of synchronization to a "genlock" or other input clock signal. The present invention contemplates any other appropriate response messages 56 according to particular needs.

In operation, to output a frame, field, or other unit of video data from digital media device 20, application 22 allocates memory 32 for one or more buffers 34, using any appropriate user-specified memory allocation strategy, and writes to or otherwise fills the buffers 34 with the video data to be output. Although outputting video data for a single buffer 34 is described, application 22 may allocate memory 32 for and fill buffers 34 in groups, as appropriate. Application 22 constructs request message 48 containing an appropriate reference 50 to filled buffer 34 and queues request message 48 in send queue 42 for ordered communication to device driver layer 18, relative to other buffer references 50 and path control instructions 52. In response, device driver layer 18 receives the request message 48 and its reference 50, accesses and reads the video data from the corresponding buffer 34 (using video hardware 40 or otherwise), and communicates the video data out of digital media device 20 through the appropriate jack for the output video path. In one embodiment, buffer 34 remains filled with video data after device driver layer 18 causes the video data to be read from buffer 34.

Device driver layer 18 next constructs an appropriate response message 56 containing reference 50 to the buffer 34 (still containing the video data) and places response message 56 in receive queue 44 for ordered communication to application 22, relative to other response messages 56 containing buffer references 50. In one embodiment, device driver layer 18 or another suitable component of digital media device 20 timestamps each buffer reference 50 as its corresponding video data is communicated from digital media device 20, such that the timestamp is available to application 22 on receipt of response message 56. As a result, application 22 may know the time at which the video data corresponding to a particular buffer 34 was communicated, which may assist application 22, for example, to synchronize among multiple video data streams. Device driver layer 18 may also stamp reference 50 with a frame, field, or other video-data-unit number or other identifier as its corresponding video data is communicated out of digital media device 20, together with or separate from timestamping the reference 50.

In one embodiment, each buffer reference 50 is timestamped according to a system clock signal available to application 22 and any other components of interest within digital media device 20. As a result, after receiving a series of timestamped buffer references 50, application 22 is able to meaningfully compare the timestamps of these references 50 and respond accordingly. Providing timestamps for references 50 that can be meaningfully compared across multiple components in digital media device 20 is an important technical advantage over previous systems in which each component is driven by a separate clock with its own time sense. In such systems, timestamps are generally not capable of being meaningfully compared across multiple components, which may be unsuitable for certain video applications. Synchronization of buffer references 50 according to timestamps generated based on a universally available system clock signal may contribute to the ability of VAL 16 to provide frame-accurate, field-accurate, or other video-data-unit-accurate control.

Moreover, in one embodiment, device driver layer 18 or another appropriate component of digital media device 20 also timestamps each path control instruction 52 with the timestamp that is associated with the first video data to be communicated from digital media device 20 subject to the control instruction 52. For example, if send queue 42 contains, in this order, a first control instruction 52, first and second buffer references 50, a second control instruction 52, and third and fourth buffer reference 50, the first control instruction 52 will get the same timestamp as the first buffer reference 50 and the second control instruction will get the same timestamp as the third buffer reference 50. Timestamped control instructions 52 are returned to application 22 in receive queue 44. As a result of such timestamping, application 22 is able to readily determine when each control instruction 52 is executed, relative to the corresponding video data being communicated out of digital media device 20, providing another important technical advantage. Other appropriate timestamping techniques may be used without departing from the intended scope of the present invention.

Application 22 receives the response message 56 and its reference 50. If response message 56 contains an indication 58 that the video data was successfully communicated from digital media device 20, application 22 de-allocates memory 32 for buffer 34 and the output process for the frame, field, or other unit of video data is complete. Rather than de-allocating memory 32 for buffer 34, the present invention contemplates application 22 reusing buffer 34 one or more times during operation of system 10 before de-allocating buffer 34. Although a single buffer 34 is discussed, application 22 may de-allocate memory 32 for buffers 34 in groups, according to particular needs. In the alternative, if response message 56 contains an error code or other indication 60 that the video data has not been successfully communicated, the application 22 may initiate the re-communication of video data or take any other appropriate action. As described above, instead of providing a synchronous indication 58 or 60 as to the communication of particular video data, response message 56 may contain any appropriate asynchronous information 62 relating more generally to communication of video data in digital media device 20, for example, informing application 22 that synchronization to an input clock signal has been lost.

In one embodiment, after buffer reference 50 has been queued in send queue 42, the corresponding buffer 34 is considered "on loan" to VAL 16 and inaccessible to application 22. Once the buffer reference 50 has been returned to application 22 in receive queue 44, application 22 may again access buffer 34. Application 22 may be responsible for ensuring that buffer 34 remains valid until buffer reference 50 has been returned and not, for example, freed immediately after buffer reference 50 is placed onto send queue 42. In one embodiment, for at least output video paths, a particular buffer reference 50 and its corresponding video data may be communicated multiple times using VAL 16, in connection with a single or multiple output video paths, according to particular needs.

Figure 4:
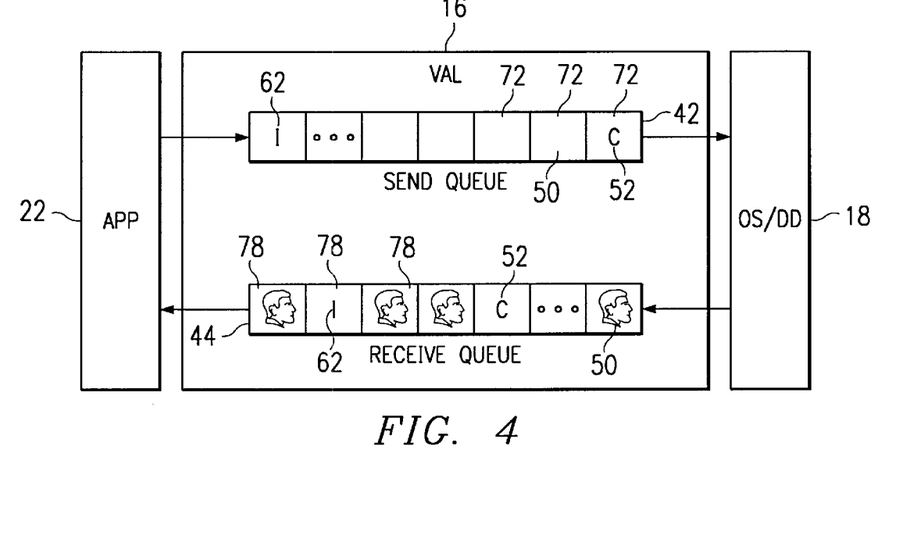
FIG. 4 illustrates the exemplary inputting of video data using send and receive queues.

FIG. 4 illustrates exemplary inputting of video data into digital media device 20 using send queue 42 and receive queue 44 of VAL 16. Although send queue 42 and receive queue 44 are described for both outputting and inputting video data, the present invention contemplates VAL 16 having separate send and receive queues for outgoing and incoming video data streams. In one embodiment, a separate send queue 42 and receive queue 44 may be associated with each incoming video path. As for the outputting of video data described above with reference to FIG. 3, send queue 42 contains ordered request messages 72 from application 22 to be communicated to device driver layer 18. In one embodiment, like request messages 48 for the send queue 42, each request message 72 includes either: (1) a pointer or other suitable reference 50 to a particular empty buffer 34 within memory 32; (2) a jack or path control instruction 52; or (3) other suitable information 62 relating to communication of video data into digital media device 20.

Similar to outputting of video data from digital media device 20, application 22 may use one or more path control instructions 52 to modify at least one parameter of each input video path synchronous with communication of video data through the path. In one embodiment, path control instruction 52 is queued onto the tail of send queue 42 for communication to and processing at the device driver layer 18 in the order it is received relative to buffer references 50. As a result, new control settings take effect beginning with the buffer 34 that corresponds to the first buffer reference 50 following the path control instruction 52 in send queue 42. However, buffers 34 that precede the path control instruction 52 in send queue 42 are not affected. Thus, application 22 may precisely specify buffers 34 to which a particular path control instruction 52 should apply, according to the order in which application 22 queues buffer references 50 and path control instructions 52 in send queue 42. As a result, the present invention may provide, for incoming video data in addition to outgoing video data, frame-accurate, field-accurate, or other video-data-unit-accurate control.

Input path control instructions 52 may include, for example only and not by way of limitation: (1) where to start capturing horizontally the video data for one or more frames, fields, or other video-data-units; (2) the number of pixels to capture horizontally; (3) where to start capturing vertically video data for one or more frames, fields, or other video-data-units; (4) where to place one or more frames, fields, or other video-data-units within a fall raster scan; (5) the number of lines to within one or more frames, fields, or other video-data-units; (6) a pixel format to capture into, including but not limited to pixel color space, component size, and component ordering; (7) whether two or more video fields or other video-data-units will be interleaved in a buffer 34; (8) one or more height-to-width, width-to-height, or other pixel aspect ratios; (9) scaling for captured video data; (10) the resulting width or height of a scaled video image for a frame, field, or other video-data-unit; (11) the number of pixels to skip after a scan line has been written to memory 32; and (12) any other appropriate path control instructions 52. One or more path control instructions 52 may overlap in their effects. One or more input path control instructions 52 may require settings to be consistent with settings for jacks that are associated with the corresponding video path.

In one embodiment, jack control instructions 52 relating to an input jack may include, for example, modifying the phase, gain, amplitude, level, timing, or other suitable characteristic of an input jack involved in a video path of interest. One or more input jack control instructions 52 may overlap in their effects on associated video subsystem hardware. As described above with reference to FIG. 3 for output jack control instructions 52, input jack control instructions 52 need not be synchronized relative to buffer references 50. They may therefore take effect mid-frame, mid-field, or otherwise mid-video-data-unit as opposed to at any particular frame, field, or video-data-unit boundary. Although jack control instructions 52 are described as being unordered relative to buffer references 50, the present invention contemplates appropriately synchronized jack control instructions 52 according to particular needs.

Similar to the outputting of video data, also associated with each input video path is a receive queue 44 in VAL 16 containing ordered response messages 78 from device driver layer 18 to be communicated to application 22. In one embodiment, each response message 78 includes either: (1) a pointer or other reference 50 to a particular buffer 34 in memory 32 containing video data 45 received from outside digital media device 20; (2) a control instruction 52 returned from device driver layer 18 following its execution; or (3) any other suitable information 62 relating to communication of video data into the digital media device 20. For example only and not by way of limitation, information 62 may indicate a loss of video input signal. The present invention contemplates other suitable response messages 56 according to particular needs.

In operation, to input a frame, field, or other unit of video data into digital media device 20, application 22 allocates memory 32 for one or more buffers 34, using any appropriate user-specified memory allocation strategy. Although inputting video data for a single buffer 34 is described, application 22 may allocate memory 32 for buffers 34 in one or more groups. Application 22 constructs request message 72 containing an appropriate reference 50 to empty buffer 34 and queues or otherwise inserts request message 72 in send queue 42 for ordered communication to device driver layer 18, relative to other buffer references 50 and path control instructions 52. In response, device driver layer 18 receives the request message 72 and associated buffer reference 50.

If a frame, field, or other unit of incoming video data is present, the device driver layer 18 writes to or otherwise fills buffer 34 with that video data (using I/O device 40 or otherwise). Device driver layer 18 next constructs a response message 78 containing reference 50 to the buffer 34 that now contains the video data and queues or otherwise inserts response message 78 in receive queue 44 for ordered communication to application 22, relative to other response messages 78 containing buffer references 50. In one embodiment, device driver layer 18 or another suitable component of digital media device 20 timestamps each buffer reference 50 as its corresponding video data is received into digital media device 20, such that the timestamp is available to application 22 on receipt of response message 78. As a result, application 22 learns the time at which the video data corresponding to a particular buffer 34 was received, which may assist application 22, for example, to synchronize among multiple video data streams. Device driver layer 18 may also stamp reference 50 with a frame, field, or other video-data-unit number or other identifier as its corresponding video data is received into digital media device 20, together with or separate from timestamping the reference 50.

Moreover, in one embodiment, device driver layer 18 or another appropriate component of digital media device 20 also timestamps each path control instruction 52 with the timestamp that is associated with the first video data to be received from digital media device 20 subject to the control instruction 52. For example, if send queue 42 contains, in this order, a first control instruction 52, first and second buffer references 50, a second control instruction 52, and third and fourth buffer reference 50, the first control instruction 52 will get the same timestamp as the first buffer reference 50 and the second control instruction will get the same timestamp as the third buffer reference 50. Timestamped control instructions 52 are returned to application 22 in receive queue 44. As a result of such timestamping, application 22 is able to readily determine when each control instruction 52 is executed, relative to the corresponding video data being received into digital media device 20, providing another important technical advantage. Other appropriate timestamping techniques may be used according to particular needs.

Application 22 receives response message 78 and its reference 50, reads the video data from the specified buffer 34, and processes the video data as appropriate. For example only and not by way of limitation, application 22 may write the video data to a disk drive or communicate it to another component within digital media device 20. As described above, rather than a synchronous buffer reference 50 or control instruction 52, response message 78 may contain appropriate information 62 that relates in some suitable manner to the inputting of video data into digital media device 20. Also as noted above, the present invention contemplates send queue 42 and receive queue 44 for outgoing video data being integral, in whole or in part, to send queue 42 and receive queue 44 for incoming video data.

The queue framework within VAL 16, including send queue 42 and receive queue 44, allows incoming streams of video data to be treated in substantially the same manner as outgoing streams. This framework provides a unified programming model for input and output control paths, which makes application development and debugging simpler, faster, and more economical; allows applications 22 to interact with multiple I/O devices that share a group of buffers 34 between their respective video channels; provides for the synchronization of path control instructions with references to buffers 34, for input as well as output, to provide frame-accurate, field-accurate, or other video-data-unit-accurate control; allows application 22 to know the relative times at which video data for buffers 34 was communicated or received, or at which control instructions 52 are executed; and provides other important technical advantages over prior systems, which require that the incoming and outgoing video streams to be treated differently.

The unified approach, involving the use of send queue 42 and receive queue 44 for both incoming and outgoing video data, allows applications 22 to interact with multiple I/O devices that share a group of buffers 34 (which may be sized, aligned, or otherwise registered to be appropriate for all I/O devices of interest) between their respective video channels. For example, and not by way of limitation, application 22 may wish to use two streams of incoming video data, received from first and second video devices, to perform a "wipe" effect and communicate the resulting video data to a third video device as an outgoing video data stream. To further illustrate this merely exemplary effect, assume the incoming video data streams from the first and second devices have the following constant images:

| Device 1 | Device 2 |
|----------|----------|
| ##### | ***** |
| ##### | ***** |
| ##### | ***** |

Application 22 may send appropriate references 50 to empty buffers 34, and associated path control instructions 52, to the first and second devices (using device driver layer 18) using send queue 42. A references 50 to the same buffer 34 may be sent to both the first and second devices substantially simultaneously, such that the first and second devices write the appropriate incoming video data to the appropriate place within buffer 34 according to the preceding path control instruction 52. For example, the request messages 48 in send queue 42 for the first and second devices may be ordered:

Application→B4, C4_1, B3, C3_1, B1, C2_1, B1, C1_1→Device 1

Application→B4, C4_2, B3, C3_2, B1, C2_2, B1, C1_2→Device 2

In one embodiment, application 22 is able to synchronize this activity based on the precise timestamping of buffer references 50 as corresponding buffers 34 are filled with incoming video data and also based on the fact that video is generally constant rate. A wipe effect might incorporate these incoming streams and communicate a resulting outgoing stream having the following images (from right to left going out of digital media device 20):

*** # ##* ###** ####* #####

*** # ##* ###** ####* #####

*** # ##* ###** ####* #####

After buffers 34 are filled according to path control instructions 52 to reflect the wipe effect, application 22 receives the corresponding references 50 to the filled buffers 34 in receive queue 44, application 22 communicates the references 50 to the third device (through device driver layer 18), the third device reads the associated video data from buffers 34, and the video data is communicated out of digital media device 20. In a more complex example, application 22 may also communicate path control instructions 52 to the third device (through device driver layer 18) to further control the manner in which the video data for these buffers 34 is communicated from digital media device 20. Performing such an effect using previous systems typically would have required pixels to be manipulated elsewhere in the system, such as at a CPU associated with a graphics subsystem, with resulting copying of data and thus increased memory usage. According to the present invention, the effect is precisely and efficiently implemented using buffer references 50 and associated path control instructions 52 in the unified queue framework of VAL 16, providing an important technical advantage.

Furthermore, in one embodiment, VAL 16 provides application 22 with the ability to control outgoing or incoming video data rates through insertion of dummy buffer references 50 into send queue 42. For example, if the outgoing video data rate is sixty frames per second and application 22 wishes to cut that rate in half (to thirty frames per second), application 22 may insert a dummy reference 50 between each regular reference 50. Device driver layer 18 may interpret dummy reference 50 as an instruction to communicate, in this case a second time, outgoing video data for the preceding buffer 34. In the alternative, application 22 may simply communicate the same regular buffer reference 50 twice in succession to cut the outgoing video data rate in half.

Although in this example the data rate is being halved, the present invention contemplates inserting any appropriate number of dummy references 50 between a pair of regular references 50 to achieve the desired video data rate. For example, two dummy references 50 might be inserted between each pair of regular references 50 to cut the data rate to a third of its previous value (in this particular example to twenty frames per second). Three dummy references 50 might be inserted between each pair of regular references 50 to cut the data rate to a fourth of its previous value (in this particular example to fifteen frames per second). Alternatively, as described above, application 22 might simply communicate the same regular buffer reference 50 three or four times in succession to cut the outgoing video data rate to a third or a fourth, respectively, of its previous value.

In one embodiment, device driver layer 18 returns the dummy reference 50 to application 22 in receive queue 44, application 22 receives dummy reference 50, and application 22 may reuse dummy reference 50 (singly or together with one or more other dummy references 50, according to the desired rate) between another pair of regular references 50 in send queue 42. Reducing the incoming video data rate may be achieved in a similar manner, with application 22 inserting one or more dummy references 50 in send queue 42 between each pair of regular references 50 to empty buffers 34. Dummy references 50 are returned to application 22 in receive queue 44, still ordered relative to references 50 to buffers 34 (which now contain incoming video data), and cycled back from application 22 to device driver layer 18 in send queue 42. In one embodiment, cycling dummy references 50 in this manner through send queue 42 and receive queue 44 of VAL 16 may decrease the amount of DMA required, providing an important technical advantage.

Figure 5A:
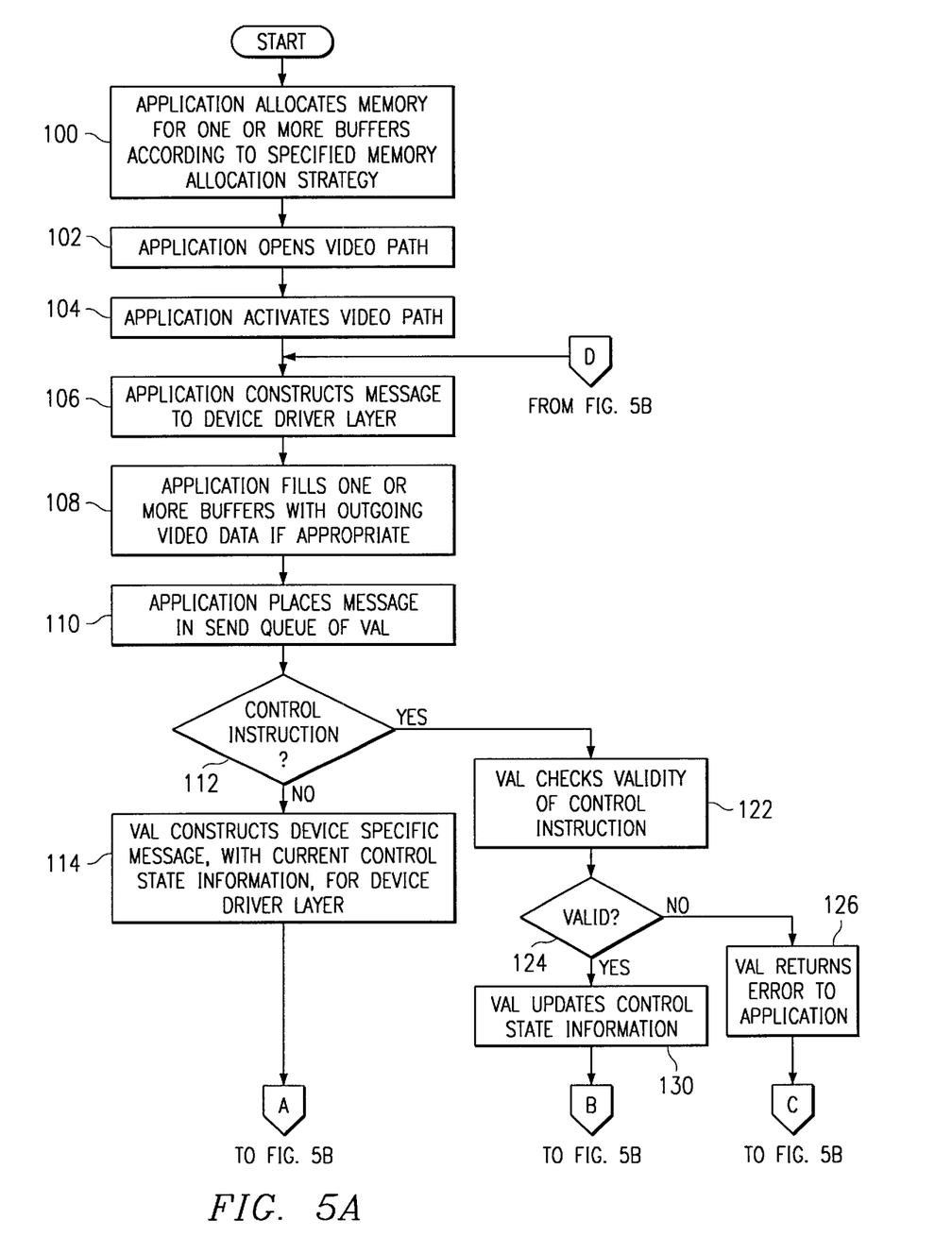
Figure 5B:
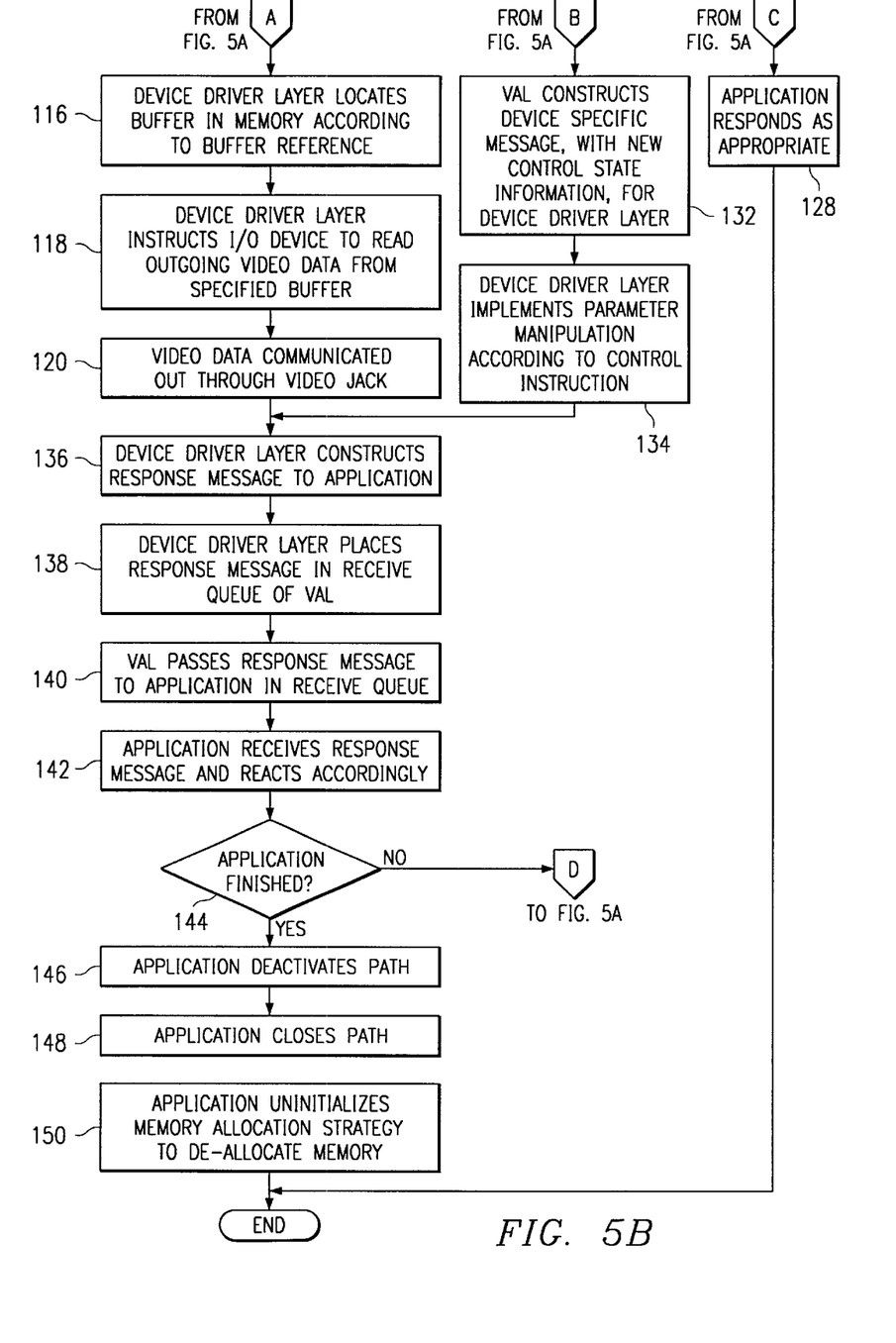

FIG. 5 illustrates an exemplary method of communicating outgoing video data in digital media device 20 using VAL 16. The method begins at step 100, where application 22 allocates memory 32 for one or more buffers 34, according to a user-specified or other appropriate memory allocation strategy, for the stream of outgoing video data. Application 12 opens an appropriate video output path at step 102 and activates the video path at step 104. At step 106, application 22 constructs one or more request messages 48, each containing a reference 50 to a buffer 34, a path or jack control instruction 52, or other information 62. If a request message 48 contains a buffer reference 50, application 22 writes to or otherwise fills associated buffer 34 with outgoing video data at step 108. Application 22 may fill buffer 34 with video data at step 108 before, substantially simultaneous with, or after constructing request message 48 at step 106. Application 22 places the constructed request message 48 in send queue 42 of VAL 16 at step 110 for ordered communication to device driver layer 18, relative to other request messages 48.

At step 112, if request message 48 includes a buffer reference 50 rather than a control instruction 52, VAL 16 constructs a suitable device-specific message at step 114 for the particular component of digital media device 20 that is responsible for communicating the video data for that buffer reference 50 out of the digital media device 20. This message may include current control state information for the output video path, video jack, or both video path and video jack associated with the outgoing video data. At step 116, device driver layer 18 locates the specified buffer 34 according to reference 50 and, at step 118, instructs OF device 40 to read the outgoing video data from the specified buffer 34. The video data is communicated out of digital media device 20 through the appropriate jack for the video output path at step 120, and the method proceeds to step 136 for construction of an appropriate response message 56. As part of communicating the video data out of digital media device 20, device driver layer 18 or another appropriate component of digital media device 20 may timestamp the associated reference 50, stamp reference 50 with a number or other identifier, or both. In one embodiment, buffer 34 remains filled with video data after the video data is read from buffer 34.

At step 112, if request message 48 includes control instruction 52, VAL 16 checks the validity of control instruction 52 at step 122. If control instruction 52 is deemed invalid at step 124 according to one or more appropriate criteria, VAL 16 returns an error code or any other suitable indication to application 22 at step 126, application 22 responds as appropriate at step 128, and the method ends. A response of application 22 might include, as an example, reconstructing and recommunicating request message 48 if appropriate. If control instruction 52 is deemed valid at step 124, VAL 16 updates control state information for the corresponding path or jack at step 130 to reflect control instruction 52. At step 132, VAL 16 constructs a suitable device-specific message corresponding to control instruction 52, which may include the updated control state information, and communicates the message to the device driver layer 18. Device driver layer 18 receives the device-specific message and, at step 134, implements the parameter manipulation specified in control instruction 52 with respect to the appropriate path or jack. The method then proceeds to step 136, for construction of an appropriate response message 56. As part of implementing the control instruction 52, device driver layer 18 or another appropriate component of digital media device 20 may timestamp control instruction 52.

At step 136, device driver layer 18 constructs a suitable response message 56 containing either: (1) reference 50 to the buffer 34 containing the outgoing video data (preferably with an indication 58 or 60 of whether the video data was successfully communicated); (2) control instruction 52, or (3) any other information relating to communication of video data from digital media device 20. As described above, response message 56 may include appropriate stamping information. At step 138, device driver layer 18 places response message 56 in receive queue 44 of VAL 16 for ordered communication to application 22, relative to other response messages 56. VAL 16 passes response message 56 to application 22 in receive queue 44 at step 140 and, at step 142, application 22 receives response message 56 and reacts accordingly. For example, application 22 may determine that it needs to recommunicate video data corresponding to one or more buffer references 50 based on an indication 60 that the video data was not successfully communicated.

If other video data remains to be communicated at step 144 for the outgoing video data stream, such that application 22 is not finished with respect to that video data stream, the method returns to step 106 for construction of additional request messages 48. However, the present invention contemplates construction of one or more request messages 48 (and associated operations) overlapping to any suitable extent with the communication of one or more other request messages 48 through send queue 42 (and associated operations) or communication of one or more response messages 56 through receive queue 44 (and associated operations). If communication of video data for the outgoing video data stream is complete at step 144, application 22 deactivates the appropriate video output path at step 146 and closes that path at step 148. At step 150, application 22 may uninitialize the user-specified memory allocation strategy in use for this particular video data stream to de-allocate memory 32 previously allocated to buffers 34, and the method ends.

Figure 6A:
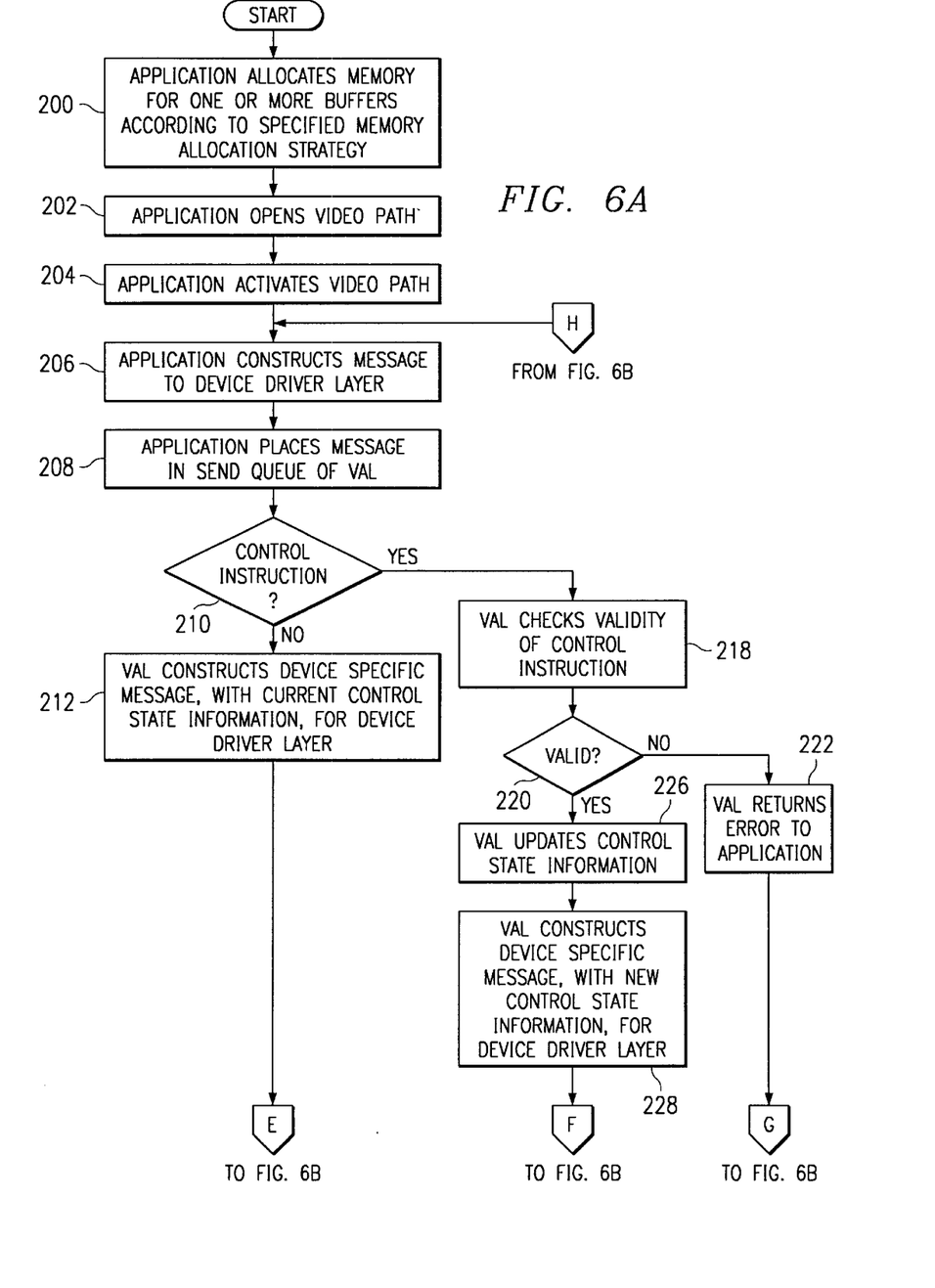
Figure 6B:
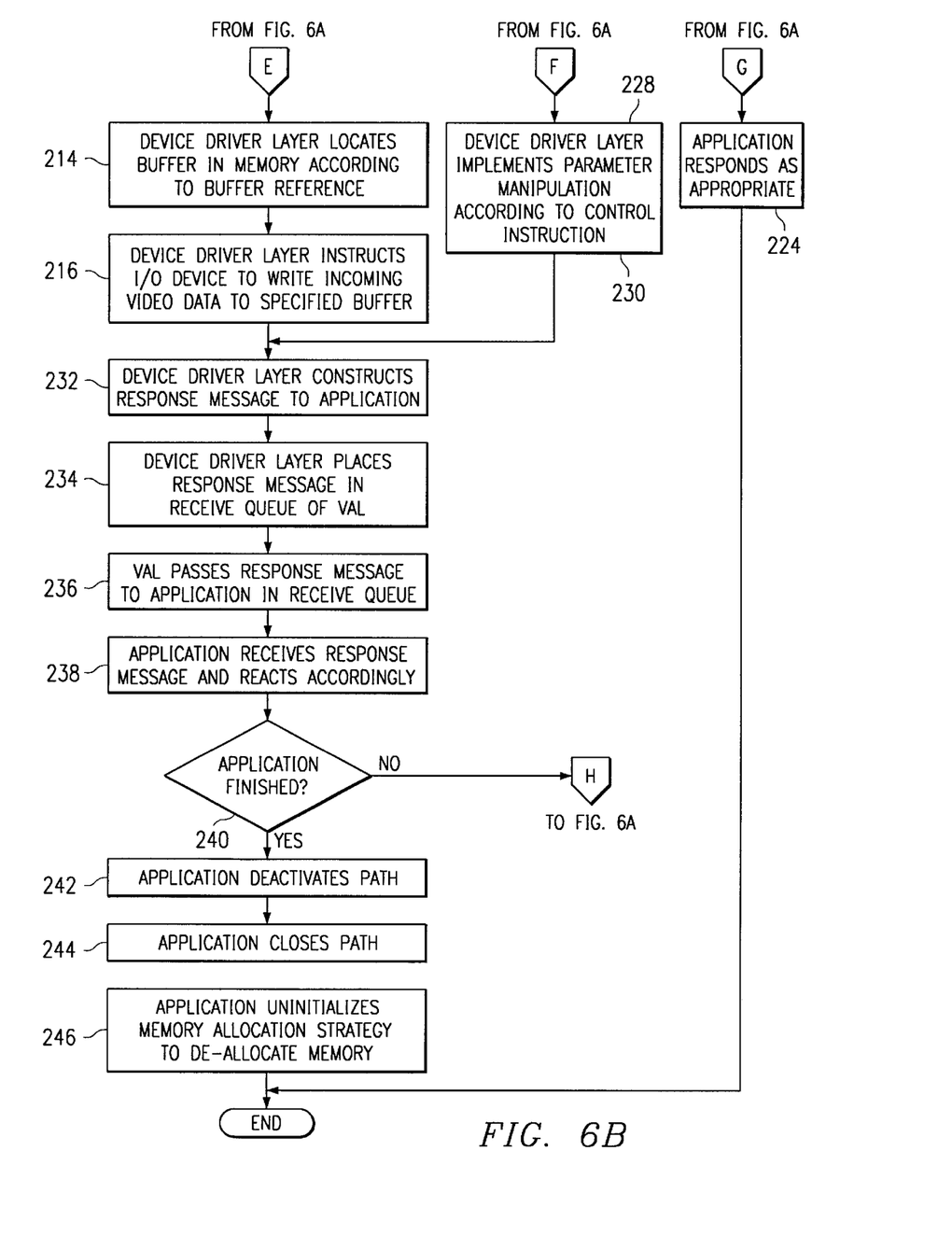

FIG. 6 illustrates an exemplary method of communicating incoming video data in digital media device 20 using VAL 16. The method begins at step 200, where application 22 allocates memory 32 for one or more buffers 34, according to a user-specified or other appropriate memory allocation strategy, for the stream of incoming video data. Application 12 opens an appropriate video input path at step 202 and activates the video path at step 204. At step 206, application 22 constructs one or more request messages 72, each containing a reference 50 to an empty buffer 34, a path or jack control instruction 52, or other information 62. Application 22 places each constructed request message 72 in send queue 42 of VAL 16 at step 208 for ordered communication to the device driver layer 18, relative to the other request messages 48.

At step 210, if request message 72 includes a buffer reference 50 rather than a control instruction 52, VAL 16 constructs a suitable device-specific message at step 212 for the particular component of digital media device 20 that is responsible for receiving the video data for buffer reference 50 into digital media device 20. This message may include current control state information for the input video path, video jack, or both video path and video jack associated with the incoming video data. At step 214, device driver layer 18 locates the specified buffer 34 according to reference 50 and, at step 216, instructs the I/O device 40 to write the incoming video data to specified buffer 34. The method then proceeds to step 232 for construction of a suitable response message 78. In association with receiving the video data into the digital media device 20, device driver layer 18 or another suitable component of digital media device 20 may timestamp associated reference 50, stamp reference 50 with a number or other identifier, or both of these.

At step 210, if request message 72 includes control instruction 52, VAL 16 checks the validity of control instruction 52 at step 218. If control instruction 52 is deemed invalid at step 220 according to one or more appropriate criteria, VAL 16 returns an error code or any other suitable indication to application 22 at step 222, application 22 responds as appropriate at step 224, and the method ends. A response of application 22 might include, as an example, reconstructing and recommunicating request message 72 if appropriate. If control instruction 52 is deemed valid at step 220, VAL 16 updates control state information for the corresponding path or jack at step 226 to reflect control instruction 52. At step 228, VAL 16 constructs a suitable device-specific message corresponding to control instruction 52, which may include the updated control state information, and communicates the message to the device driver layer 18. Device driver layer 18 receives the device-specific message and, at step 230, implements the parameter manipulation specified in control instruction 52 with respect to the appropriate path or jack. The method then proceeds to step 232, for construction of an appropriate response message 78. As part of implementing the control instruction 52, device driver layer 18 or another appropriate component of digital media device 20 may timestamp control instruction 52.

At step 232, device driver layer 18 constructs a suitable response message 78 containing either: (1) reference 50 to the buffer 34 that contains the incoming video data; (2) control instruction 52, or (3) other information relating to the receiving of video data into digital media device 20. As described above, response message 78 may include appropriate stamping information. At step 234, device driver layer 18 places the response message 78 in the receive queue 44 of VAL 16 for ordered communication to application 22, relative to other response messages 78. VAL 16 passes response message 78 to application 22 in receive queue 44 at step 136 and, at step 138, application 22 receives response message 78 and reacts accordingly. For example, application 22 may write video data corresponding to one or more buffer references 50 to hard disk or communicate the video data to another component of digital media device 20.

If other video data remains to be communicated at step 240 for the incoming video data stream, such that application 22 is not finished with respect to that data stream, the method may return to step 206 for construction of additional request messages 72. However, the present invention contemplates construction of one or more request messages 72 (and associated operations) overlapping to any suitable extent with the communication of one or more other request messages 72 through send queue 42 (and associated operations) or communication of one or more response messages 78 through receive queue 44 (and associated operations). The application 22 may communicate sufficient references 50 to empty buffers 34 such that an empty buffer 34 is substantially always available to receive incoming video data if such video data is present. If communication of video data for the incoming video data stream is complete at step 240, application 22 deactivates the appropriate video input path at step 242 and closes that input path at step 244. At step 246, application 22 may uninitialize the user-specified memory allocation strategy in use for this input video data stream to de-allocate memory 32 previously allocated to buffers 34, and the method ends.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for communicating video data in a digital media device, comprising:
   an application layer comprising one or more applications;
   a device driver layer associated with an operating system and video hardware of the digital media device; and
   a video abstraction layer (VAL) coupled to the application layer and to the device driver layer, the VAL comprising a send queue containing ordered references to buffers each operable to contain video data, the VAL further comprising a receive queue containing ordered references to buffers each operable to contain video data, the send and receive queues of the VAL being used in substantially the same manner for both incoming video data received into the digital media device and outgoing video data to be communicated from the digital media device.

2. The system of claim 1, wherein the references in the send queue for incoming video data are to empty buffers and the references in the send queue for outgoing video data are to filled buffers.

3. The system of claim 1, wherein each buffer is operable to contain a video data unit selected from the group consisting of a frame of video data and a field of video data.

4. The system of claim 1, wherein the buffers are allocated in a memory of the digital media device according to a memory allocation strategy, the VAL not dictating the memory allocation strategy.

5. The system of claim 4, wherein an application in the application layer is operable to specify the buffer allocation strategy and allocate the memory for the buffers accordingly.

6. The system of claim 1, wherein at least some of the buffers are shared among two or more video paths.

7. The system of claim 1, wherein the application is operable to insert one or more dummy buffer references between at least one pair of regular buffer references in the send queue to control a video data rate.

8. The system of claim 1, wherein the send queue further contains at least one control instruction for manipulating at least one parameter of video data for one or more buffer references that follow the control instruction in the send queue.

9. The system of claim 8, wherein the VAL is operable to provide control for one or more particular video data units according to the control instruction, the video data units selected from the group consisting of frames of video data and fields of video data.

10. The system of claim 8, wherein the control instruction does not affect parameters of video data for buffer references that precede the control instruction in the send queue.

11. The system of claim 8, wherein the control instruction comprises a path control instruction.

12. The system of claim 8, wherein the receive queue further contains at least one control instruction having a timestamp associated with communication of corresponding video data into or out of the digital media device.

13. The system of claim 1, wherein the references in the receive queue for outgoing video data further comprise indications of whether associated video data has been successfully communicated from the digital media device.

14. The system of claim 1, wherein the references in the receive queue comprise timestamps associated with the communication of corresponding video data into or out of the digital media device.

15. A video abstraction layer (VAL) for communicating video data in a digital media device, comprising:
   a send queue containing ordered references to buffers each operable to contain video data;
   a receive queue containing ordered references to buffers each operable to contain video data; and
   the send and receive queues being used in substantially the same manner for both incoming video data received into the digital media device and outgoing video data to be communicated from the digital media device.

16. The VAL of claim 15, wherein the references in the send queue for incoming video data are to empty buffers and the references in the send queue for outgoing video data are to filled buffers.

17. The VAL of claim 15, wherein each buffer is operable to contain a video data unit selected from the group consisting of a frame of video data and a field of video data.

18. The VAL of claim 15, wherein the buffers have been allocated in a memory of the digital media device according to a memory allocation strategy, the VAL not dictating the memory allocation strategy.

19. The VAL of claim 18, wherein the VAL allows an application to specify the buffer allocation strategy and to allocate the memory for the buffers accordingly.

20. The VAL of claim 15, wherein at least some of the buffers are shared among two or more video paths.

21. The VAL of claim 15, wherein the send queue is operable to contain one or more dummy buffer references between at least one pair of regular buffer references to control a video data rate.

22. The VAL of claim 15, wherein the send queue further contains at least one control instruction for manipulating at least one parameter of video data for one or more buffer references that follow the control instruction in the send queue.

23. The VAL of claim 22, wherein the VAL is operable to provide control for one or more particular video data units according to the control instruction, the video data units selected from the group consisting of frames of video data and fields of video data.

24. The VAL of claim 22, wherein the control instruction does not affect parameters of video data for buffer references that precede the control instruction in the send queue.

25. The VAL of claim 22, wherein the control instruction comprises a path control instruction.

26. The VAL of claim 22, wherein the receive queue further contains at least one control instruction having a timestamp associated with communication of corresponding video data into or out of the digital media device.

27. The VAL of claim 15, wherein the references in the receive queue for outgoing video data further comprise indications of whether associated video data has been successfully communicated from the digital media device.

28. The VAL of claim 15, wherein the references in the receive queue comprise timestamps associated with the communication of corresponding video data into or out of the digital media device.

29. A method of communicating video data in a digital media device, comprising:
   using a send queue to communicate, between an application layer and a device driver layer, ordered references to buffers for containing video data;
   using a receive queue to communicate, between the device driver layer and the application layer, ordered references to buffers for containing video data; and
   using the send and receive queues in substantially the same manner for both incoming video data received into the digital media and outgoing video data to be communicated from the digital media device.

30. The method of claim 29, wherein the references in the send queue for incoming video data are to empty buffers and the references in the send queue for outgoing video data are to filled buffers.

31. The method of claim 29, wherein each buffer is for containing a video data unit selected from the group consisting of a frame of video data and a field of video data.

32. The method of claim 29, further comprising allowing the buffers to be allocated in a memory of the digital media device according to a specified memory allocation strategy, without dictating the memory allocation strategy.

33. The method of claim 29, further comprising allowing at least some of the buffers to be shared among two or more video paths.

34. The method of claim 29, further comprising using the send queue to communicate one or more dummy buffer references inserted between at least one pair of regular buffer references to control a video data rate.

35. The method of claim 29, further comprising using the send queue to communicate at least one control instruction for manipulating at least one parameter of video data for one or more buffer references that follow the control instruction in the send queue.

36. The method of claim 35, further comprising allowing one or more particular video data units to be controlled according to the control instruction, the video data units selected from the group consisting of frames of video data and fields of video data.

37. The method of claim 35, further comprising allowing the parameters of video data, for buffer references that precede the control instruction in the send queue, to be unaffected.

38. The method of claim 35, wherein the control instruction comprises a path control instruction.

39. The method of claim 35, further comprising using the receive queue to communicate at least one control instruction having a timestamp that is associated with communication of corresponding video data into or out of the digital media device.

40. The method of claim 29, wherein the references in the receive queue for outgoing video data further comprise indications of whether associated video data has been successfully communicated from the digital media device.

41. The method of claim 29, wherein the references in the receive queue comprise timestamps associated with the communication of corresponding video data into or out of the digital media device.

* * * * *

UNITED STATES PATENT AND TRADEMARK OFFICE
CERTIFICATE OF CORRECTION

PATENT NO. : 6,466,939 B1
DATED : October 15, 2002
INVENTOR(S) : Lai et al.

It is certified that error appears in the above-identified patent and that said Letters Patent is hereby corrected as shown below:

Column 3,
Line 41, replace "12" after "module layer" with -- 14 --.

Column 6,
Line 49, replace "fall" with -- full --.

Column 10,
Line 1, replace "fall" with -- full --.

Column 12,
Line 38, replace "B1" after "C3_1," with -- B2 --.
Line 40, replace "B1" after "C3_2," with -- B2 --.

Signed and Sealed this

Eighteenth Day of February, 2003

JAMES E. ROGAN
*Director of the United States Patent and Trademark Office*